United States Patent
Haulk et al.

(10) Patent No.: US 6,877,133 B2
(45) Date of Patent: Apr. 5, 2005

(54) METHODS AND APPARATUS FOR ERROR DETECTION AND CORRECTION IN AN ELECTRONIC SHELF LABEL SYSTEM

(75) Inventors: Kevin W. Haulk, Griffin, GA (US); Cheryl K. Harkins, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 504 days.

(21) Appl. No.: 10/044,687

(22) Filed: Jan. 11, 2002

(65) Prior Publication Data

US 2003/0135805 A1 Jul. 17, 2003

(51) Int. Cl.[7] .......................... G06F 7/02; H03M 13/03
(52) U.S. Cl. ....................................................... 714/821
(58) Field of Search ................................ 714/819, 821, 714/748, 749, 18, 735; 340/5.91, 540

(56) References Cited

U.S. PATENT DOCUMENTS 5,704,049 A * 12/1997 Briechle ..................... 345/744
5,758,064 A * 5/1998 Zimmerman et al. ...... 340/10.2
5,878,064 A * 3/1999 Goodwin, III .............. 714/821

* cited by examiner

*Primary Examiner*—Shelly A Chase
(74) *Attorney, Agent, or Firm*—Priest & Goldstein PLLC

(57) ABSTRACT

An electronic shelf label (ESL) system with register corrections is described. An ESL includes a plurality of registers for storing information controlling the content and formatting of information. A host computer system includes an ESL data file comprising a data image of the ESL's registers. The host computer calculates one or more sumchecks of the data image, and transmits one or more bedcheck messages including the sumchecks to the ESL. The ESL receives each bedcheck message and compares each received sumcheck with a sumcheck calculated using the information stored in the ESL's registers. If the received sumcheck matches the calculated sumcheck, the ESL transmits a positive acknowledgement message to the host computer. Otherwise, the ESL transmits a negative acknowledgment message to the host computer. The host computer then transmits a series of messages to the ESL updating the plurality of registers with the data image.

10 Claims, 3 Drawing Sheets

METHODS AND APPARATUS FOR ERROR DETECTION AND CORRECTION IN AN ELECTRONIC SHELF LABEL SYSTEM

FIELD OF THE INVENTION

The present invention relates generally to improvements in electronic shelf label (ESL) systems used in transaction establishments. More specifically, the present invention relates to improvements in ESL systems including systems and methods for an ESL system which detects and corrects data errors in an ESL's registers or memory.

BACKGROUND OF THE INVENTION

ESL systems typically include a plurality of ESLs for each merchandise item in a store. ESLs display the price of corresponding merchandise items on store shelves and are typically attached to a rail along the leading edge of the shelves. A store may contain thousands of ESLs to display the prices of the merchandise items. The ESLs are coupled to a central server where information about the ESLs is typically maintained in an ESL data file which contains ESL identification information and ESL merchandise item information. The central server sends messages, including price change messages, to the ESLs.

While prior ESL systems provide many of the capabilities required by retailers, these systems may suffer from various disadvantages. For example, a typical prior art ESL system may not provide the ability to automatically detect and automatically correct when an ESL contains incorrect data in a register or memory location. Therefore, it would be desirable to provide an ESL system and method that provides automatic detection and correction of data errors in an ESL's registers or memory.

SUMMARY OF THE INVENTION

The present invention advantageously provides methods and apparatus for an improved electronic shelf label (ESL) system. In one aspect, the present invention includes an ESL for displaying information relating to an item associated with the ESL. The ESL includes a plurality of registers for storing information controlling the content and formatting of the information displayed. A host computer system includes an ESL data file comprising a data image of the ESL's registers. The host computer calculates one or more sumchecks of the data image, and transmits one or more bedcheck messages including the sumchecks to the ESL. The ESL receives each bedcheck message and compares each received sumcheck with a sumcheck calculated using the information stored in the ESL's registers. If the received sumcheck matches the sumcheck calculated using the information stored in the plurality of registers, the ESL transmits a positive acknowledgement message to the host computer. If the received sumcheck does not match the sumcheck calculated using the information stored in the plurality of registers, the ESL transmits a negative acknowledgment message to the host computer, and the host computer then transmits a series of messages to the ESL updating the plurality of registers with the data image contained in the ESL data file.

A more complete understanding of the present invention, as well as further features and advantages of the invention, will be apparent from the following detailed description and the accompanying drawings.

DETAILED DESCRIPTION

The present invention now will be described more fully with reference to the accompanying drawings, in which several presently preferred embodiments of the invention are shown. This invention may, however, be embodied in various forms and should not be construed as limited to the embodiments set forth herein. Rather, these embodiments are provided so that this disclosure will be thorough and complete, and will fully convey the scope of the invention to those skilled in the art.

Further details of an ESL system suitable for use in conjunction with the present invention are found in U.S. patent application Ser. No. 10/044,021 filed Jan. 11, 2002 entitled "Methods and Apparatus for Performing Delta Updates of an Electronic Shelf Label", U.S. patent application Ser. No. 10/044,610 filed Jan. 11, 2002 entitled "Methods and Apparatus for Intelligent Data Bedcheck of an Electronic Shelf Label", U.S. patent application Ser. No. 10/044,020 filed Jan. 11, 2002 entitled "Methods and Apparatus for Reduced Electronic Shelf Label Power Consumption", U.S. patent application Ser. No. 10/044,535 filed Jan. 11, 2002 entitled "Methods and Apparatus for Error Detection and Correction of an Electronic Shelf Label System Communication Error", U.S. patent application Ser. No. 10/044,439 filed Jan. 11, 2002 entitled "Methods and Apparatus for Automatically Locating an Electronic Shelf Label", U.S. patent application Ser. No. 10/044,440 filed Jan. 11, 2002 entitled "Methods and Apparatus for Conserving Battery Power in an Electronic Shelf Label System", U.S. patent application Ser. No. 10/044,668 filed Jan. 11, 2002 entitled "Methods and Apparatus for Automatic Assignment of a Communication Base Station and Timeslot for an Electronic Shelf Label", all of which are assigned to the assignee of the present invention and incorporated by reference herein in their entirety.

Figure 1:
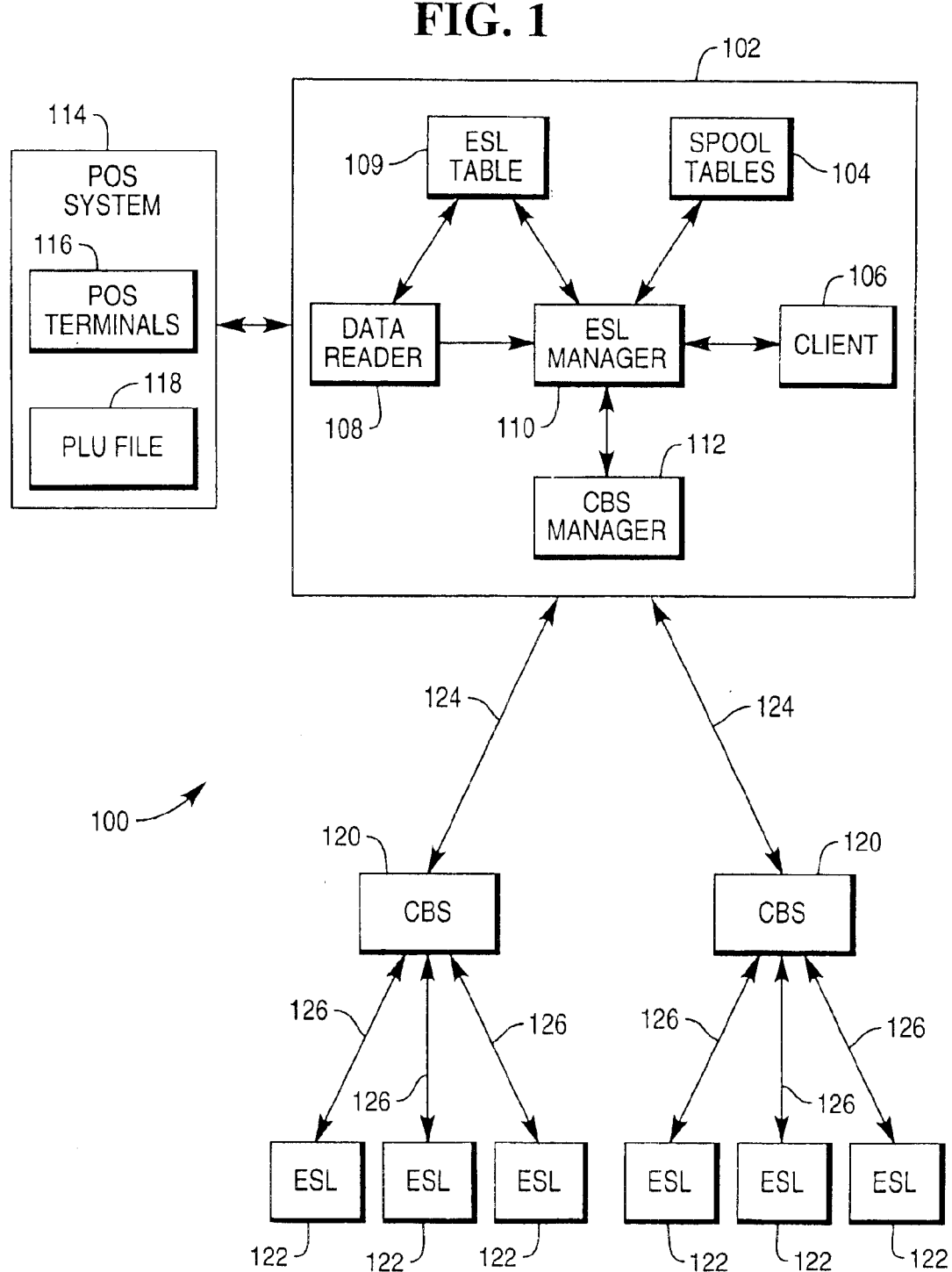
FIG. 1 shows a block diagram of a transaction management system in accordance with the present invention.

FIG. 1 shows a transaction management system 100 in accordance with the present invention. The system 100 includes an ESL computer system 102 and a point-of-sale (POS) system 114. Here, components 102 and 114 are shown as separate components that are networked together, but they and their subcomponents may also be combined or divided in various ways.

The host computer system 102 includes an ESL table 109, spool tables 104, data reader 108, ESL manager 110, a client 106 and a communication base station (CBS) manager 112. POS system 114 includes a price look-up (PLU) file 118 and POS terminals 116.

The system 100 also includes CBSs 120 and ESLs 122. The CBSs 120 maybe suitably mounted in or near the ceiling of the retail establishment. ESLs 122 are typically attached to store shelving adjacent to items.

The ESL manager 110 records and schedules messages to the ESLs 122. The ESL manager 110 monitors and maintains an action list for the ESLs 122 utilizing spool tables 104, and provides a scheduling functionality for time related events which need to occur at a future point at time. Items on the action list may be provided from client components as requests for work, may be automatically generated by the ESL manager 110, or could be due to requests that required additional processing at a later date, such as, for example, a series of sale prices to be represented at the tags at given times. Based on the events the ESL manager 110 has scheduled for an ESL 122, the ESL manager 110 creates the appropriate request and sends the request to the CBS manager 112. The requests may include register or memory updates of an ESL 122, diagnostic requests such as bedchecks, location requests such as finds, assignments to a particular timeslot, and the like. Based on the response returned from the ESL 122 via the CBS Manager 120, the ESL Manager 112 then updates the ESL table 109 and spool tables 104 as appropriate. Such updates may include marking a particular task as completed, updating the data image of the ESL 122, and the like. A client application, such as client application 106, may interface with the ESL manager 110. The data reader 108 provides an interface from the ESL manager 110 to the POS system 114.

The CBS manager 112 is responsible for all communications, processing, and monitoring of the CBSs. The CBS 112 manager receives information intended to be transmitted to the ESLs 122 and processes it into a form appropriate for use by the CBSs 120 and ESLs 122. The CBS manager 112 processes an ESL's 122 response after a CBS 120 has received a response from a particular ESL 122 and then passed that response to the CBS manager 112. Additionally, the CBS manager 112 monitors the CBSs 120 for problems, performs diagnostics on the CBSs 120 and logs errors.

The messages are sent to the CBSs 120 through communications link 124. Communications link 124 may suitably utilize radio frequency (RF) communication, infrared (IR) communication, a wired link, or some combination of communication techniques. After receiving a message from the host system 102, the CBSs 120 then transmit the message to the ESLs 122 utilizing communications link 126, which may suitably utilize RF communication, IR communication, a wired link or some combination of communication techniques. In an alternate embodiment, host system 102 may communicate directly with ESLs 122.

After receiving a message, the ESLs 122 transmit a response to CBSs 120 over communication link 126. The CBSs 120 would then process and retransmit the response message to the CBS manager 112 over communication link 124.

The ESL data file 109 consists of multiple records, with each record corresponding to a particular ESL 122 in a retail establishment. The record for each ESL 122 includes a number of fields, with each field containing the data which is supposed or assumed to be in one of the registers of the ESL 122. Thus, the record contains a picture, or full data image, of what data is intended to be stored in the ESL 122, and consequently, what the ESL 122 should be displaying on the ESL's display. Additionally, each record may include a variety of additional non-display information related to the ESL 122, such as the timeslot the ESL 122 listens on, the CBS 120 assigned to the ESL 122, and the PLU number of the item associated with the ESL 122. The record may also contain diagnostic and tally information related to that ESL 122, such as when the last time a message was sent to the ESL 122, the last time the ESL 122 had a data bedcheck, a count of how many times the ESL 122 has failed its data bedcheck, and the like.

Figure 2:
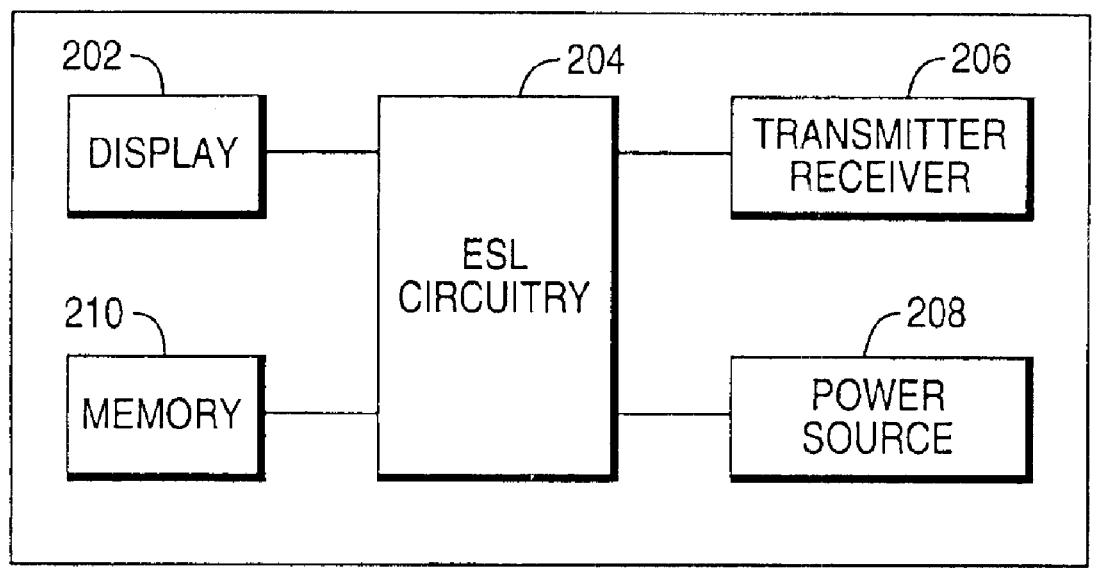
FIG. 2 is a block diagram of an ESL in accordance with the present invention.

FIG. 2 shows a block diagram of the ESL 122 in accordance with the present invention. A display 202 displays information, such as item price and related data. ESL 122 includes a transmitter/receiver 206 for transmitting messages and receiving messages. The transmitter/receiver may utilize RF communication, IR communication, a wired link or some combination of communication techniques. A power source 208 provides power for the operation of ESL 122. Power may be provided by a battery, solar cell, an external source, or other suitable techniques. The operation of ESL 122 is controlled by ESL circuitry 204. ESL circuitry 204 decodes incoming messages received, and performs any actions indicated by the messages. For example, if a price change message is received, the ESL circuitry 204 would cause the display 202 to be updated with the new price information. ESL circuitry 204 includes memory or registers 210, hereinafter referenced as memory. The ESL memory 210 may contain many types of information. For example, the memory 210 may include display registers which contains the actual text to be displayed by the ESL 122. This text may include item price, informative or promotional text, text directed to employees, and the like. Other registers may contain data which controls various parameters related to the display of the text, such as display register selection and timing sequences, for example.

Occasionally, due to a hardware error, software malfunction, transmission error or the like, the memory 210 of an ESL 122 may contain incorrect data which does not match the data contained in the ESL data file 109. This incorrect data may result in the ESL 122 displaying information in an incorrect sequence or simply displaying the wrong information. In order to verify that the ESL 122 is displaying the correct information, one or more data bedcheck messages may be transmitted by the host system 102 to a particular ESL 210 which verify that the data contained in the memory 210 matches the data for that ESL 122 contained in the ESL data file 109. Each data bedcheck message contain a sumcheck or error checking code, such as a cyclical redundancy check (CRC), of one or more fields of register data in the ESL data file 109. In other words, the sumcheck is a number calculated using the register data in the ESL data file 109 which corresponds to the data which should be stored in one of the registers of ESL 122. Each data bedcheck message requests that the ESL compare the received sumcheck with a sumcheck calculated using the data actually contained in one or more of the ESL's registers. In one aspect, a plurality of bedcheck messages are transmitted to the ESL, with each bedcheck message verifying a portion of the ESL's memory or registers. For each data bedcheck message received, if the received sumcheck matches the calculated sumcheck, the ESL 122 responds to the data bedcheck message with a positive acknowledgement message (ACK). If the received sumcheck does not match the calculated sumcheck, the ESL 122 responds to the data bedcheck message with a negative acknowledgement message (NACK).

If a NACK is received in response to one of the bedcheck messages, the ESL manager 110 then takes corrective action to update the ESL 122 with the correct information. The ESL manger initiates the transmission of one or more messages to the ESL 122 which cause at least a portion of the register data in the ESL 122 to be updated with the data contained in the ESL data file 109.

In one aspect of the present invention, the ESL manager 110 creates a single data image for a bedcheck containing the registers or memory location which are to be verified. This data image is provided to the CBS manager 112 which generates multiple bedcheck commands including sumchecks for transmission to the ESL 122. When the CBS manager 112 returns a response to the ESL manager 110, the response indicates if the bedcheck of the data image was successful. If every sumcheck was verified, CBS manager 112 provides a successful indication to the ESL manager 110. If any sumcheck resulted in a NAK, the CBS manager 112 returns a simple failure indication to the ESL manager 110, without a detailed description as to what failed. Since the ESL manager 110 is not informed what registers failed, after the ESL manager 110 receives a failure indication, the ESL manager 110 instructs the CBS manager 122 to update all of the data in the ESL 122 with the data contained in the ESL data file 109.

Figure 3:
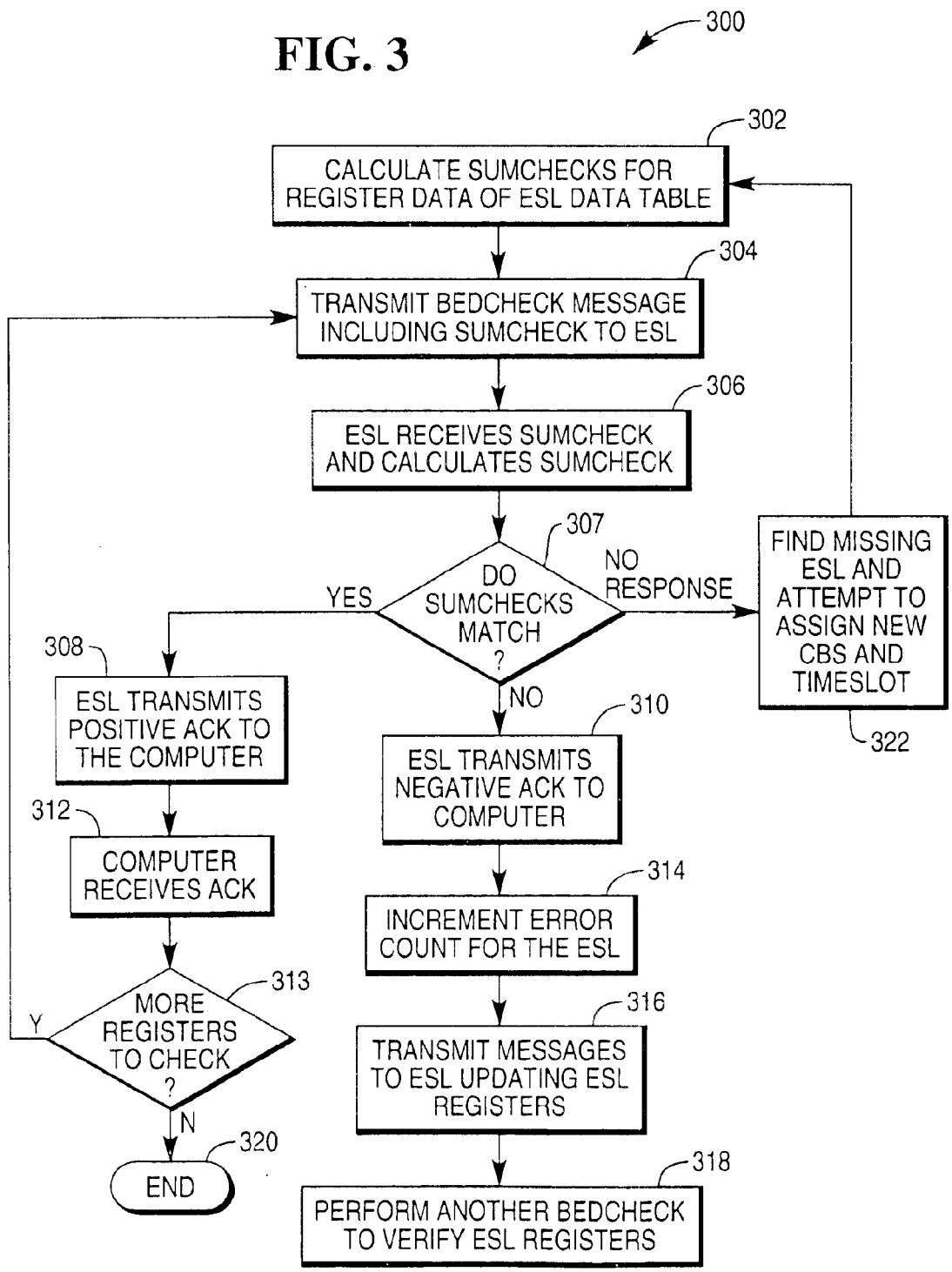
FIG. 3 shows a method of detecting and correcting data errors in an ESL's registers or memory in accordance with the present invention.

FIG. 3 shows a method 300 of automatically detecting and correcting data errors in an ESL's registers or memory in accordance with the present invention. In step 302, a computer system, such as host computer system 102, calculates sumchecks of the register data contained in a data file, such as ESL data file 109, far the ESL. In a preferred embodiment, one sumcheck is calculated for each ESL register. In step 304, the computer system transmits a bedcheck message to the ESL including one of the calculated sumchecks. In step 306, the ESL receives the bedcheck message and the ESL's circuitry calculates a sumcheck using the data actually contained in one of the ESL's registers. In step 307, the sumchecks are compared locally within the ESL. If the received sumcheck matches the calculated sumcheck, the method continues to step 308. If the received sumcheck does not match the calculated sumcheck, the method continues to step 310. If the ESL does not respond to the bedcheck message, the method continues to step 322. In step 322, the computer system attempts to find the ESL. If the ESL is found, the ESL is assigned to a new timeslot and/or CBS and the method returns to step 302.

Returning to step 308, in step 308 the ESL 122 responds to the data bedcheck message by transmitting a positive acknowledgement message (ACK) to the computer system. Next, in step 312, the computer receives the ACK. In step 313, the computer determines if there are more registers within the ESL to verify. If there are no more registers to verify, the method continues to step 320 and ends. If there are more registers to verify the method returns to step 304.

Returning to step 310, the ESL 122 responds to the data bedcheck message by transmitting a negative acknowledgement message (NACK). In step 314, the computer system receives the NACK and an error count in a database is incremented to reflect the initial bedcheck failure. In step 316, the computer system transmits to the ESL a series of messages which cause all of the registers in the ESL to be updated with the register data contained in the ESL data file. In step 318, another bedcheck is performed to verify the contents of the ESL registers. If, after multiple bedchecks are performed, the error count associated with the ESL reaches a predetermined count, then an error message may be generated, informing a system operator of a problem associated with the ESL.

It will be apparent to those skilled in the art that various modifications and variations can be made in the present invention without departing from the spirit and scope of the present invention. Thus, it is intended that the present invention cover the modifications and variations of this invention provided they come within the scope of the appended claims and their equivalents. For example, while the present invention may utilize a single bedcheck message to verify a single register, other combinations are possible, such as utilizing a single bedcheck message (and single sumcheck) to verify the contents of multiple registers or memory locations. Furthermore, while a presently preferred embodiment utilizes an ESL to display informational text or price of an associated item, an ESL system may utilize ESLs in a variety of applications and environments without departing from the spirit and scope of the present invention.

We claim:

1. A method of automatically detecting and correcting errors in an electronic shelf label (ESL), the ESL comprising ESL registers, the ESL registers storing data controlling the content and formatting of information displayed by the ESL, the method comprising the steps of:

(a) providing an ESL data file comprising a data image of the intended contents of the ESL's registers;

(b) calculating a sumcheck of at least a portion of the data image by an ESL computer;

(c) transmitting a bedcheck message to the ESL by the ESL computer, the bedcheck message including the sumcheck;

(d) receiving bedcheck message by the ESL;

(e) comparing the received sumcheck with a sumcheck calculated using a portion of the actual contents of the ESL's registers, by ESL control circuitry;

(f) transmitting a positive acknowledgement message from the ESL to the ESL computer, if the received sumcheck matches the sumcheck calculated using the actual contents of the ESL's registers;

(g) transmitting a negative acknowledgment message to the ESL computer, if the received sumcheck does not match the sumcheck calculated using the actual contents of the ESL's registers; and (h) transmitting at least one message to the ESL updating the ESL's registers with the data image contained in the ESL data file, if a negative acknowledgement is received by the ESL computer.

2. The method of claim 1 wherein step (b) through step (h) is repeated to verify the full data image.

3. The method of claim 1 further comprising the step of:

attempting to find the ESL and assign the ESL to a new timeslot, if no acknowledgement is received in response to the bedcheck message within a predetermined period of time; and if the ESL is successfully found and assigned, performing steps (b) through (h).

4. The method of claim 1 further comprising the step of:

providing an error indication, if no acknowledgement is received in response to the bedcheck message with a predetermined period of time.

5. The method of claim 1 further comprising the step of:

incrementing, by the ESL computer, a failed checksum tally associated with the ESL, if a negative acknowledgement is received by the ESL computer.

6. The method of claim 4 further comprising the step of:

providing an error message to a system operator.

7. An electronic shelf label (ESL) system comprising:

an ESL for displaying information, the ESL including a plurality of registers for storing information controlling the content and formatting of the information displayed;

an ESL data file remotely storing a data image of the plurality of registers; and a host computer system for calculating a sumcheck of a portion of the data image, and transmitting a bedcheck message including the sumcheck to the ESL, the ESL receiving the bedcheck message and comparing the received sumcheck with a sumcheck calculated using the information stored in a portion of the plurality of registers, said ESL transmitting a positive acknowledgement message to the ESL computer if the received sumcheck matches the sumcheck calculated by the ESL, said ESL transmitting a negative acknowledgment message to the ESL computer if the received sumcheck does not match the sumcheck calculated by the ESL, the host computer transmitting a series of messages to the ESL updating the plurality of registers with the data image contained in the ESL data file, if a negative acknowledgement is received by the host computer.

8. The system of claim 7 wherein the host computer attempts to find the ESL and assign the ESL to a new timeslot, if no acknowledgement is received in response to the bedcheck message within a predetermined period of time.

9. The system of claim 7 wherein the host computer provides an error indication, if no acknowledgement is received in response to the bedcheck message with a predetermined period of time.

10. The system of claim 7 wherein the host computer increments a failed sumcheck tally with the ESL, if a negative acknowledgement is received by the host computer.

* * * * *